Figure 1:
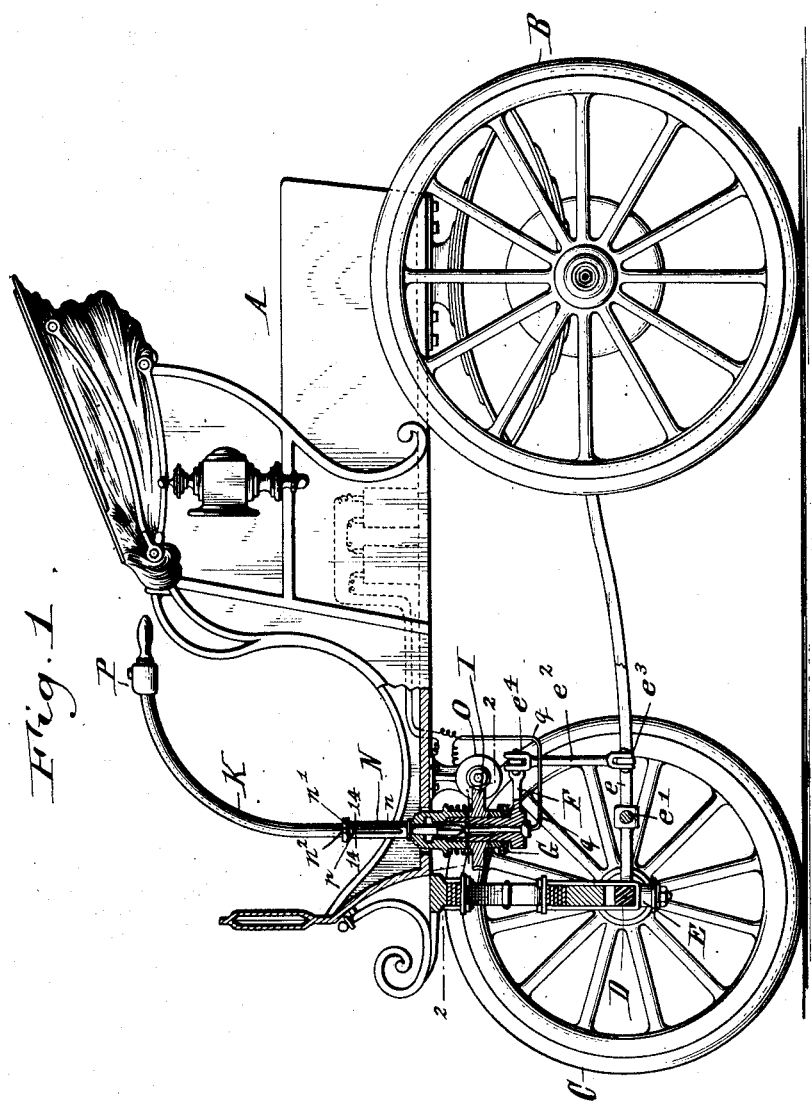

No. 666,308. Patented Jan. 22, 1901.
J. W. FARNOFF.
STEERING MECHANISM FOR MOTOR VEHICLES.
(Application filed Aug. 15, 1900.)

(No Model.) 3 Sheets—Sheet 1.

Witnesses:
Allen G. Fraser.
Harry H. Weinstock.

Jay W. Farnoff, Inventor.
By Neuhart & Burkhart,
Attorneys.

No. 666,308. Patented Jan. 22, 1901.
J. W. FARNOFF.
STEERING MECHANISM FOR MOTOR VEHICLES.
(Application filed Aug. 15, 1900.)
(No Model.) 3 Sheets—Sheet 2.
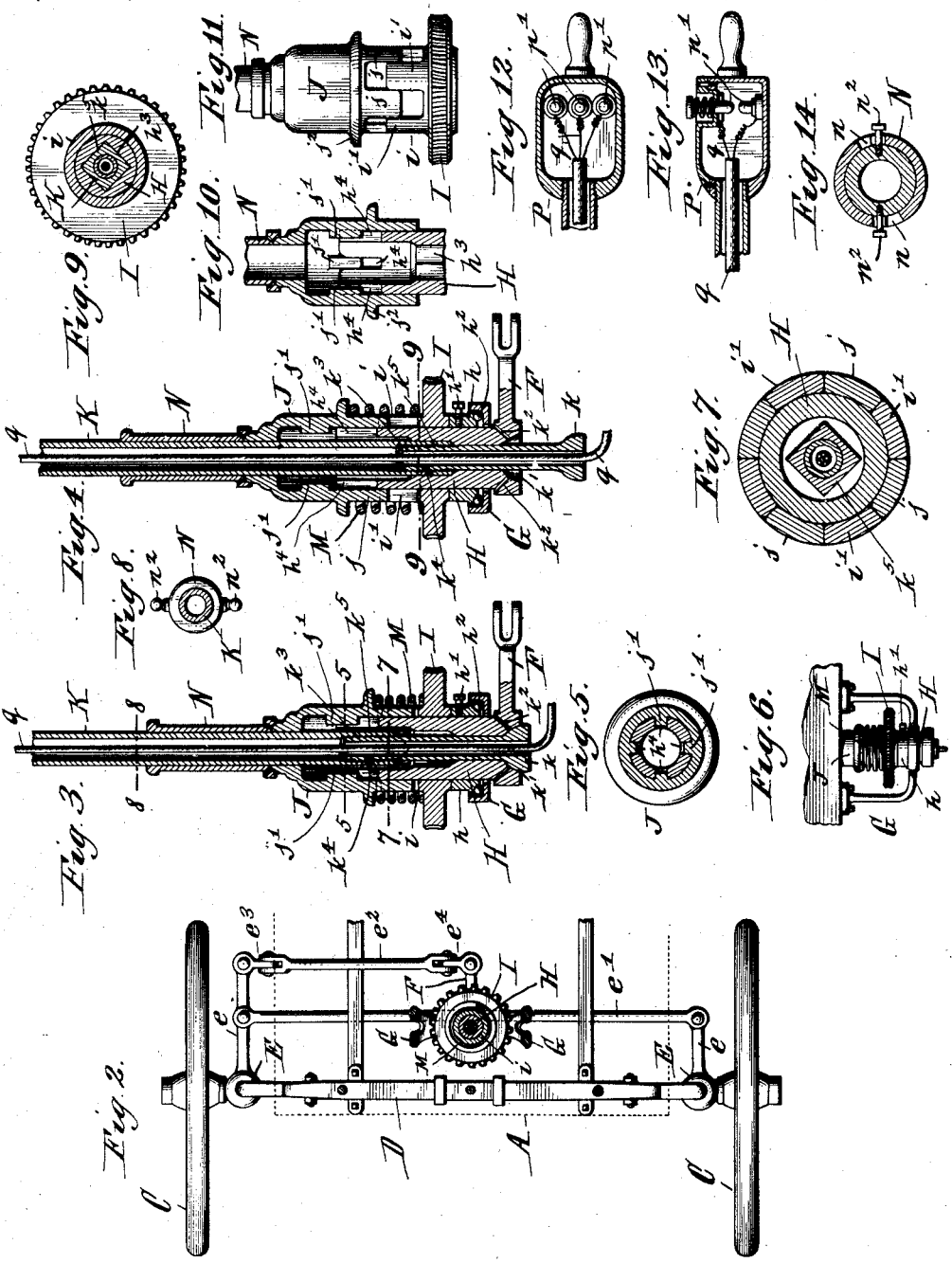
Witnesses: Jay W. Farnoff, Inventor.
Allen G. Fraser. By Neuhart & Burkhart,
Harry K. Weinstock Attorneys.

No. 666,308. Patented Jan. 22, 1901.
J. W. FARNOFF.
STEERING MECHANISM FOR MOTOR VEHICLES.
(Application filed Aug. 15, 1900.)
(No Model.) 3 Sheets—Sheet 3.
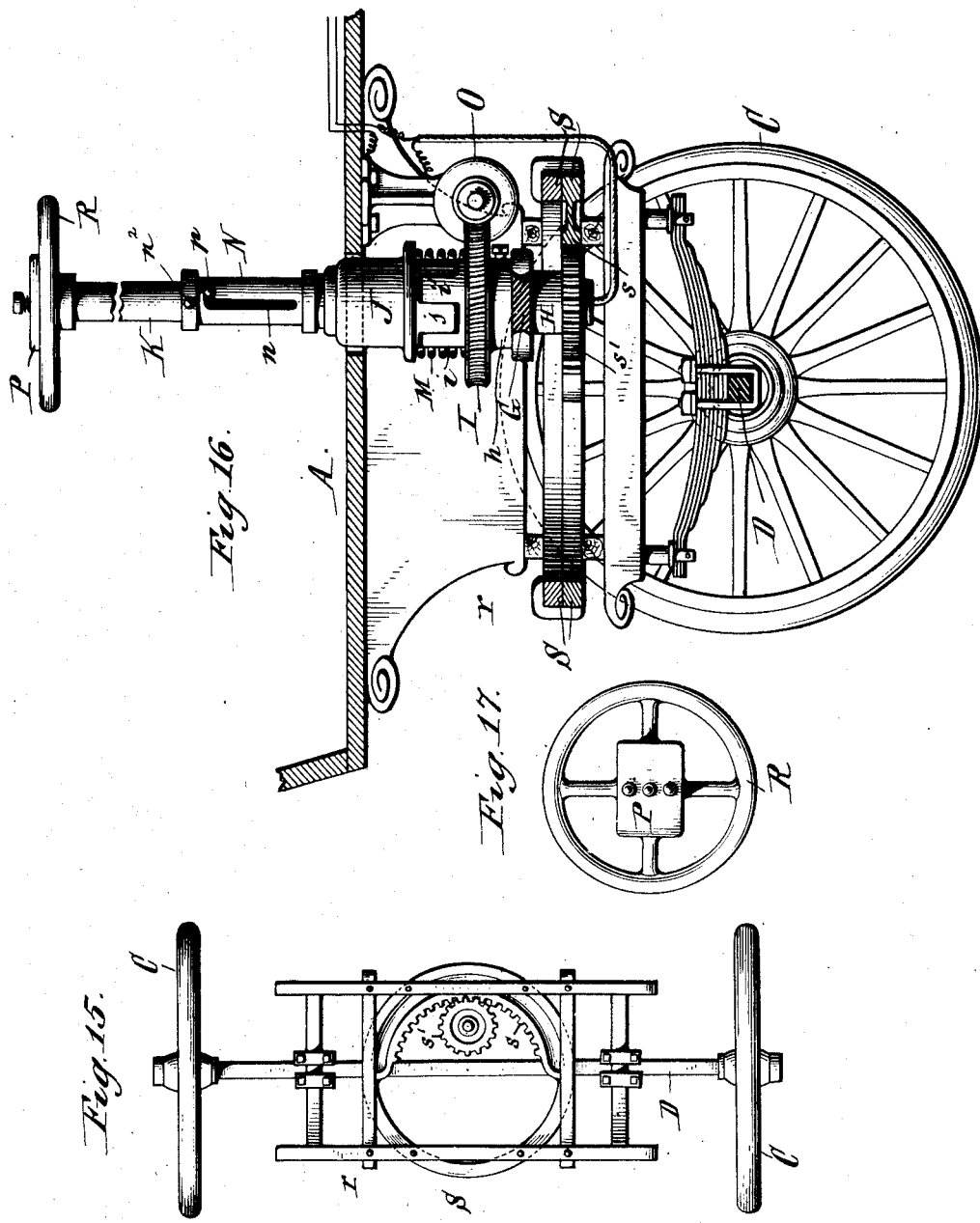
Witnesses:
Allen G. Fraser.
Harry H. Weinstock
Jay W. Farnoff, Inventor,
By Neuhart & Burkhart,
Attorneys.

UNITED STATES PATENT OFFICE.

JAY W. FARNOFF, OF BUFFALO, NEW YORK, ASSIGNOR OF TWO-THIRDS TO HENRY KOONS, OF SAME PLACE.

STEERING MECHANISM FOR MOTOR-VEHICLES.

SPECIFICATION forming part of Letters Patent No. 666,308, dated January 22, 1901.

Application filed August 15, 1900. Serial No. 26,914. (No model.)

*To all whom it may concern:*

Be it known that I, JAY W. FARNOFF, a citizen of the United States, residing at Buffalo, in the county of Erie and State of New York, have invented certain new and useful Improvements in Steering Mechanism for Motor-Vehicles, of which the following is a specification.

This invention relates to a steering mechanism which is adapted for light vehicles as well as for broughams, carryalls, trucks, and other heavy vehicles propelled by electrical power; but it may be as readily used on vehicles propelled by steam, gasolene, or any other suitable motive power.

The object of this invention is to provide a simple, powerful, and responsive steering mechanism which is so constructed as to be operated in conjunction with an electric motor, and yet in the event of the motor becoming disabled or the charge of the batteries becoming exhausted, as is common, the vehicle may be steered by hand.

The invention, stated in general terms, consists in the combination of elements or parts whereby the vehicle may be steered by a motor and wherewith in case of necessity the power steering elements may be disconnected and the hand steering mechanism connected to the steering-wheels.

In the electric steering devices now in use when the motor becomes disabled or when the batteries become exhausted it is a difficult task to return the vehicle to its charging-station, even with the aid of horses or another motor-vehicle, as the driver or operator of the disabled vehicle has no control of the steering-wheels. Furthermore, in applying the steering devices now in use to gasolene or steam-propelled vehicles similar trouble arises when the batteries of the steering device become exhausted and the vehicle cannot proceed, as it is impossible to steer the same. With my device the vehicle can be steered under either condition by simply disconnecting the power steering mechanism and engaging the hand steering-lever, as will appear hereinafter.

The fundamental features of this invention are susceptible to a wide range of modification without departing from the essence thereof; but the preferred embodiment of the invention is shown in the accompanying drawings, in which—

Figure 1 is a sectional elevation of a motor-vehicle having my invention shown in section applied thereto. Fig. 2 is a horizontal section on or about line 2 2, Fig. 1, the motor being omitted to show the steering connections with the wheels. Fig. 3 is an enlarged vertical section through my improved device, the parts being shown as connected for power steering. Fig. 4 is a similar section with the parts shown in connection for hand steering. Fig. 5 is a horizontal section on line 5 5, Fig. 3. Fig. 6 is a front elevation of the lower end of the steering device, showing the manner in which it is supported. Fig. 7 is an enlarged horizontal section on line 7 7, Fig. 3, the lifting-spring being omitted. Fig. 8 is a section on line 8 8, Fig. 3. Fig. 9 is a horizontal section on line 9 9, Fig. 4. Fig. 10 is a vertical section through the coupling-sleeve, the upper end of the steering-sleeve, and the lower end of the locking-sleeve, detached from other parts. Fig. 11 is a detached elevation of the worm-wheel in engagement with the coupling-sleeve, the lower end of the locking-sleeve being shown against the upper end of the coupling-sleeve. Fig. 12 is a horizontal section through the controller. Fig. 13 is a vertical longitudinal section through the same. Fig. 14 is an enlarged section on or about line 14 14, Fig. 1. Fig. 15 is a plan view of a fifth-wheel vehicle-truck, showing my steering apparatus applied thereto. Fig. 16 is an enlarged vertical longitudinal section through said truck with my improved mechanism in elevation. Fig. 17 is a plan view of the steering-wheel as applied thereto.

Referring to the drawings in detail, like letters of reference refer to like parts in the several figures.

A represents the vehicle-body, which may be of any form and construction, B the driving-wheels, driven by any suitable motor, and C the steering-wheels, in connection wherewith my improved mechanism is adapted to be operated.

D represents the front axle, which is immovably secured to the running-gear of the vehicle and to the end of which steering-knuckles E are secured in a manner to permit of oscillation thereon. These steering-knuckles are each provided with laterally-extending spindles or stub-axles on which the steering-wheels are secured and caused to revolve. Rearwardly-disposed arms e are formed on or secured to the steering-knuckles and are connected together by a rod or link $e'$, so as to act in unison. One of the arms is lengthened and is connected to a laterally-disposed and upwardly-inclined rod or link $e^2$ by means of a double knuckle-joint $e^3$, the opposite end of this rod or link being connected by a double knuckle-joint $e^4$ to the steering-arm F, formed on the steering-sleeve of my improved device, which is secured to the vehicle-body. The pivot-pin of one part of the knuckle-joints is on a vertical plane, while the pivot-pin of the other part is on a horizontal plane. These knuckle-joints permit the vehicle-body to move vertically on the springs of the vehicle without imparting any portion of the movement to the steering-arm F or the arms e of the steering-knuckles.

G represents a support or hanger which is secured to the bottom of the vehicle-body and in which a steering-sleeve H, having the steering-arm F secured thereto, is journaled. A collar $h$ is secured to the steering-sleeve immediately above the hanger G by means of a set-screw $h'$ or in any other practical manner. Between this collar and the hanger, which is cup-shaped at this point, a series of antifriction-balls $h^2$ are interposed, which reduce friction and make the steering-sleeve responsive to the slightest turn of the motor-shaft, to which it is operatively connected. Mounted loosely on the steering-sleeve and supported by a collar $h$ is a worm-wheel I, which is provided with a hub $i$, having vertically-disposed teeth $i'$. The upper and lower ends of the bore of the steering-sleeve are round in cross-section, the upper end of the bore being somewhat larger than the lower end, while the intermediate portion $h^3$ of the bore is four-sided to receive the similar-shaped portion of the steering-lever, as will appear hereinafter.

J represents a coupling-sleeve encircling the upper end of the steering-sleeve and having vertically-disposed teeth $j$ formed at its lower end, which are in constant engagement with the teeth $i'$ of the worm-wheel hub. This permits the coupling-sleeve to move vertically on said hub, but compels it to turn with the worm-wheel. $j'$ represents lugs or ears formed on the inner periphery of the coupling-sleeve, which are adapted to be engaged with slots $h^4$, formed on the upper end of the steering-sleeve when desired to steer by power.

K represents the hand steering-lever, which is located within convenient reach of the operator, the lower vertical end passing down through the coupling-sleeve and the steering-sleeve and having a semispherical enlargement $k$ formed at its lower end, which enters a similar-shaped socket $k'$ formed in the lower end of the steering-sleeve, thus limiting the upward movement of the steering-lever. Oil ducts or passages $k^2$ are formed in the steering-sleeve, which extend downwardly to the semispherical end of the steering-lever, whereby the parts are properly lubricated. In order to permit the steering-lever to pass through the coupling-sleeve and the steering-sleeve, it is formed in two sections, joined by a screw-threaded connection $k^3$, a locking-screw $k^4$ passing through both to prevent their unscrewing. The steering-lever is provided a short distance from its lower end with a four-sided portion $k^5$, which when in position for power steering is in its elevated position out of engagement from the correspondingly-shaped portion $h^3$ of the bore of the steering-sleeve, which permits said steering-sleeve to turn without turning the steering-lever. When, however, the parts are connected for hand steering, the steering-lever is in its lowered position and the four-sided portion $k^5$ thereby made to enter the similar-shaped portion $h^3$ of said bore, thus making operative connection with the steering-sleeve.

An annular flange $j^2$ is formed on the outer periphery of the coupling-sleeve, against which the upper end of a spiral spring M bears. This spring surrounds the coupling-sleeve and the hub of the worm-wheel and bears with its lower end against said worm-wheel, its office being to lift the coupling-sleeve and disengage it from the steering-sleeve when desired to steer by hand, it being held under compression when steering by power by a locking-sleeve N, which surrounds the steering-lever and bears with its lower end against the upper end of the coupling-sleeve. Vertical slots $n$ are formed in said locking-sleeve at diametrically opposite points, the upper end of each slot being provided with a lateral extension $n'$. Pins or studs $n^2$ pass through these slots and are secured in the steering-lever, the purpose of these pins or studs being to engage the lateral extensions $n'$ of the slots and hold the locking-sleeve in its lowered position, which in turn lowers the coupling-sleeve and engages the lugs or ears $j'$, formed on the inner periphery of the same, with the slots $h^4$, formed on the upper end of the steering-sleeve, thus connecting the parts for power steering.

The motor O is of any common or familiar construction and hardly requires detailed description, saving to say that it is secured by means of bolts to the vehicle-body and has secured to its shaft a worm $o$, which is in constant mesh with the worm-wheel I.

P represents a controller of any common construction secured to the upper free end of the steering-lever, and $p$ circuit-wires, which are connected therewith and pass down through the tubular steering-lever to the motor and batteries. This controller is formed with two sets of contact-points $p'$, and the wires are so connected that when one set of the contact-points is made to coact the circuit is closed and the current is directed to one pole of the motor, which will cause the armature to rotate in one direction, and when the circuit is closed by the other set of contact-points the current is directed to the other pole of the motor and causes the armature to rotate in the opposite direction.

When steering by power, the steering-lever is in its elevated position, which permits the steering-sleeve to turn thereon. The locking-sleeve is forced down against the coupling-sleeve, so as to bring the pins or studs $n^2$ to the upper end of the slots $n$, where they are engaged with the lateral extensions $n'$ of the same, which locks the parts in proper position. This forces the coupling-sleeve against the spring-pressure and engages the lugs $j'$ of the same with the slots $h^4$ of the steering-sleeve. When the circuit is closed by one set of contact-points $p'$, the motor-shaft is caused to revolve in one direction, which through the worm turns the worm-wheel I, which in turn turns the coupling-sleeve J. The steering-sleeve being engaged with the coupling-sleeve is turned thereby and operates the arm F, which in turn, through the medium of the rod or link $e^2$, operates the arms $e$ of the steering-knuckles, which are connected together by a rod or link $e'$. The steering-wheels, being mounted on spindles or stub-axles formed on the steering-knuckles, are thereby turned to the desired angle for rounding corners or turning curves. After a turn has been made the contact-points just mentioned are separated and the circuit closed by the other set of contact-points, which directs the current to the opposite pole of the motor and revolves the shaft of the same in the opposite direction, thereby reversing the movement of the parts above described until the steering-wheels guide the vehicle on a straight line, when the contact-points are released or separated and the circuit broken. The vehicle is now propelled on a straight line without the necessity of grasping the steering-lever.

In case of accident to the motor or in the event of the batteries becoming exhausted and it is desired to steer by hand it is simply necessary to turn the locking-sleeve so as to bring the pins or studs $n^2$ in line with the vertical slots formed therein, when the steering-lever will lower by force of gravity from the position shown in Fig. 3 to the position shown in Fig. 4 and the lifting-spring M will elevate the coupling-sleeve, and with it the locking-sleeve, sufficiently to disengage the lugs or ears $j'$ from the slots $h^4$ in the steering-sleeve. By this movement the four-sided portion $k^5$ of the steering-lever enters the correspondingly-shaped portion $h^3$ of the bore of the steering-sleeve and causes the same to turn with the steering-lever. The steering-arm F is thereby operated, which in turn operates the steering-wheels, as described hereinbefore. After having recharged the batteries to steer by power the steering-lever is raised so as to bring its enlarged lower end to bear against the steering-sleeve and also to disengage the four-sided portion $k^5$ of the same from said sleeve. The locking-sleeve is then lowered, which in turn lowers the coupling-sleeve and engages the lugs or ears $j'$ of the same with the slots $h^4$ of the steering-sleeve, when the device is again connected for power steering.

In Figs. 15, 16, and 17 of the drawings I have shown a modified form of my invention particularly adapted for heavy vehicles. The steering-lever in this case is straight and the upper end thereof provided with a hand steering-wheel R, to the center of which the controller P is secured. The vehicle is shown as having a solid axle, to which is secured a spring-supported platform $r$, having one part of a fifth-wheel S secured thereto, the other part being secured to bolsters fastened to the vehicle-frame. The under half of the fifth-wheel is provided with a gear-segment $s$, which is in mesh with a gear-wheel $s'$, secured to the lower end of the steering-sleeve H, the other parts being exactly as described hereinbefore.

Having thus described my invention, what I claim is—

1. In a steering device for motor-vehicles, the combination with the motor and a controller therefor, of steering-wheels, motor-operated mechanism having connection with the steering-wheels, a hand steering-lever, and means for connecting the same with the steering-wheels and disconnecting the latter from the motor-operated mechanism, substantially as described.

2. The combination with the vehicle and its steering-wheels, of a motor, a controller for directing the movement of the motor-shaft, a steering element in operative connection with the motor, and having connection with the steering-wheels, a hand steering-lever normally out of engagement with said steering element, and mechanism for engaging the hand steering-lever with said steering element and disconnecting the latter from the motor, as set forth.

3. In a motor-vehicle, the combination with the steering-wheels, of a motor, a controller for directing the movement of the motor-shaft, a steering-sleeve in operative connection with the motor-shaft and having connection with the steering-wheels to operate the same, a steering-lever passing through said steering-sleeve and being disengaged therefrom to permit the same to turn thereon, and means for simultaneously disconnecting the motor from the steering-sleeve and engaging the latter with the steering-lever, whereby the vehicle may be steered by hand, substantially as set forth.

4. In a motor-vehicle, the combination with the steering-wheels, of a motor, a controller for directing the movement of the motor-shaft, a steering-sleeve journaled in a hanger secured to the vehicle-body and being operatively connected to the steering-wheels, operating-gearing between said steering-sleeve and the motor, a steering-lever passing through said steering-sleeve and being normally disengaged therefrom, and means for disconnecting the steering-sleeve from said operating-gearing and simultaneously engaging said steering-sleeve with the steering-lever, substantially as and for the purpose described.

5. In a motor-vehicle, the combination with the steering-wheels, of a motor, a controller for directing the movement of the motor-shaft, a worm secured on said shaft, a steering-sleeve journaled in a hanger secured to the vehicle-body and being operatively connected with the steering-wheels, a worm-wheel mounted loosely on said steering-sleeve and being in constant mesh with the worm on the motor-shaft, a coupling-sleeve for connection with the worm-wheel and the steering-sleeve whereby the latter is made to turn with the former, a steering-lever located in said steering-sleeve and being disengaged therefrom, and mechanism for simultaneously disconnecting the steering-sleeve from the worm-wheel and engaging the steering-lever with said steering-sleeve, thereby permitting the vehicle to be steered by hand, as set forth.

6. In a motor-vehicle, the combination with the steering-wheels, of a motor, a controller for directing the movement of the motor-shaft, a steering-sleeve journaled to turn on the vehicle-body and having operative connection with said steering-wheels and the motor, said steering-sleeve having a portion of its bore non-circular in cross-section, a hand steering-lever passing into said sleeve and permitting the same to turn thereon when in power-steering connection, said steering-lever having a portion thereof non-circular in cross-section which is adapted to enter said non-circular portion of the bore of the steering-sleeve, and mechanism for engaging said non-circular portion of the steering-lever with the correspondingly-shaped portion of the steering-sleeve bore and disconnecting the steering-sleeve from operative connection with the motor, substantially as set forth.

7. In a motor-vehicle, the combination with the steering-wheels, of a motor having a worm secured to the shaft thereof, a controller for directing the direction of movement of said shaft, a vertically-disposed steering-sleeve mounted to turn on the vehicle-body and having vertical slots formed on its upper end, a worm-wheel loosely mounted on said sleeve and having a toothed hub, a coupling-sleeve surrounding said steering-sleeve and having teeth formed thereon which coact with the teeth of the worm-wheel hub and permit of vertical movement of the coupling-sleeve on said hub but prevent one turning independent of the other, said coupling-sleeve having vertically-disposed lugs or ears formed on its inner periphery which are adapted to engage the vertical slots in the steering-sleeve for power steering, a hand steering-lever passing through the steering-sleeve and the coupling-sleeve and being disengaged from the steering-sleeve when the lugs or ears of the coupling-sleeve are engaged with the slots in said steering-sleeve, a locking-sleeve surrounding said steering-lever and bearing with its lower end against the upper end of the coupling-sleeve, whereby the parts are held in power-steering connection, a lifting-spring interposed between the coupling-sleeve and the worm-wheel, and means for unlocking said locking-sleeve whereby the coupling-sleeve is disengaged from the steering-sleeve by said spring and the steering-lever allowed to gravitate and engage the steering-sleeve, substantially as and for the purpose described.

8. In a motor-vehicle, the combination with the steering-wheels, of a motor having a worm secured to its shaft, a controller therefor, a steering-sleeve journaled to turn on the vehicle-body, a worm-wheel mounted loosely on said sleeve and being in constant mesh with the worm on the motor-shaft, a hand steering-lever passing through said steering-sleeve so as to permit the same to turn thereon, a coupling-sleeve surrounding said steering-sleeve and the steering-lever and being in engagement with the worm-wheel and the steering-sleeve to cause one to turn with the other, said coupling-sleeve having an annular flange formed thereon, a lifting-spring surrounding the coupling-sleeve and the hub of the worm-wheel and bearing with its upper end against said flange and with its lower end against said worm-wheel, a locking-sleeve surrounding the steering-lever whereby the coupling-sleeve is held in engagement with the steering-sleeve and whereby the steering-lever is held in its elevated and disengaged position from said steering-sleeve, said locking-sleeve having vertical slots formed therein with lateral extensions, pins or studs secured in said steering-lever and being in engagement with the lateral extensions of said slots, and means for turning said locking-sleeve to disengage said pins or studs from said lateral extensions, whereby the steering-lever will gravitate and engage the steering-sleeve and the lifting-spring will elevate the coupling-sleeve and disconnect the worm-wheel from the steering-sleeve, substantially as and for the purpose set forth.

In testimony whereof I have hereunto set my hand in the presence of two subscribing witnesses.

JAY W. FARNOFF.

Witnesses:
HARRY H. WEINSTOCK,
ALLEN G. FRASER.